United States Patent
Takano et al.

[11] Patent Number: 5,825,522
[45] Date of Patent: Oct. 20, 1998

[54] CASCADE SCANNING OPTICAL SYSTEM

[75] Inventors: Masatoshi Takano; Eiji Takasugi; Shinji Kikuchi; Tsutomu Sato; Hiroyuki Saito; Yoshiyuki Araki; Mitsunori Iima; Takashi Sasaki; Takashi Iizuka, all of Tokyo, Japan

[73] Assignee: Asahi Kogaku Kogyo Kabushiki Kaisha, Tokyo, Japan

[21] Appl. No.: 921,466

[22] Filed: Sep. 2, 1997

[30] Foreign Application Priority Data

Aug. 30, 1996 [JP] Japan ..................... 8-230246

[51] Int. Cl.$^6$ ..................................... G02B 26/08
[52] U.S. Cl. ................... 359/201; 359/204; 359/206; 359/216; 347/233
[58] Field of Search ................... 359/201–206, 359/216–219; 347/233, 235, 243; 358/474, 481, 494, 296, 302

[56] References Cited

U.S. PATENT DOCUMENTS 5,461,414 10/1995 Honda et al. .
5,654,817  8/1997 De Loor ................... 359/201

FOREIGN PATENT DOCUMENTS

| 58-130672 | 8/1983 | Japan . |
| 58-158623 | 9/1983 | Japan . |
| 58-162926 | 9/1983 | Japan . |
| 60-28618 | 2/1985 | Japan . |
| 60-35712 | 2/1985 | Japan . |
| 60-57316 | 4/1985 | Japan . |
| 61-11720 | 1/1986 | Japan . |
| 61-42615 | 3/1986 | Japan . |
| 63-50809 | 3/1988 | Japan . |

OTHER PUBLICATIONS

An English language excerpt from Konica Technical Report, vol. 9 (1996). (No Month).

Japanese language excerpt from Konica Technical Report, vol. 9 (1996). (No Month).

*Primary Examiner*—James Phan
*Attorney, Agent, or Firm*—Greenblum & Bernstein, P.L.C.

[57] ABSTRACT

A cascade scanning optical system which includes a first laser scanning optical system for emitting a first laser beam to scan a surface of a member to generate a first scanning line, and a second laser scanning optical system for emitting a second laser beam to scan the surface to generate a second scanning line, wherein the first and second laser scanning optical systems are arranged so as to combine the first scanning line with the second scanning line at a point of contact therebetween in a main scanning direction to form a single scanning line, and wherein each of the first and second laser scanning optical systems is designed as a non-telecentric system through which the incident angle of a corresponding one of the first and second laser beams relative to the surface varies in accordance with a variation in the position of a scanning spot of the corresponding one of the first and second laser beams on the surface in the main scanning direction, and further wherein an incident angle of each of the first and second laser beams relative to the surface in the vicinity of the point of contact is predetermined to be larger than an incident angle of the same in the vicinity of a corresponding one of opposite ends of the single scanning line.

6 Claims, 3 Drawing Sheets

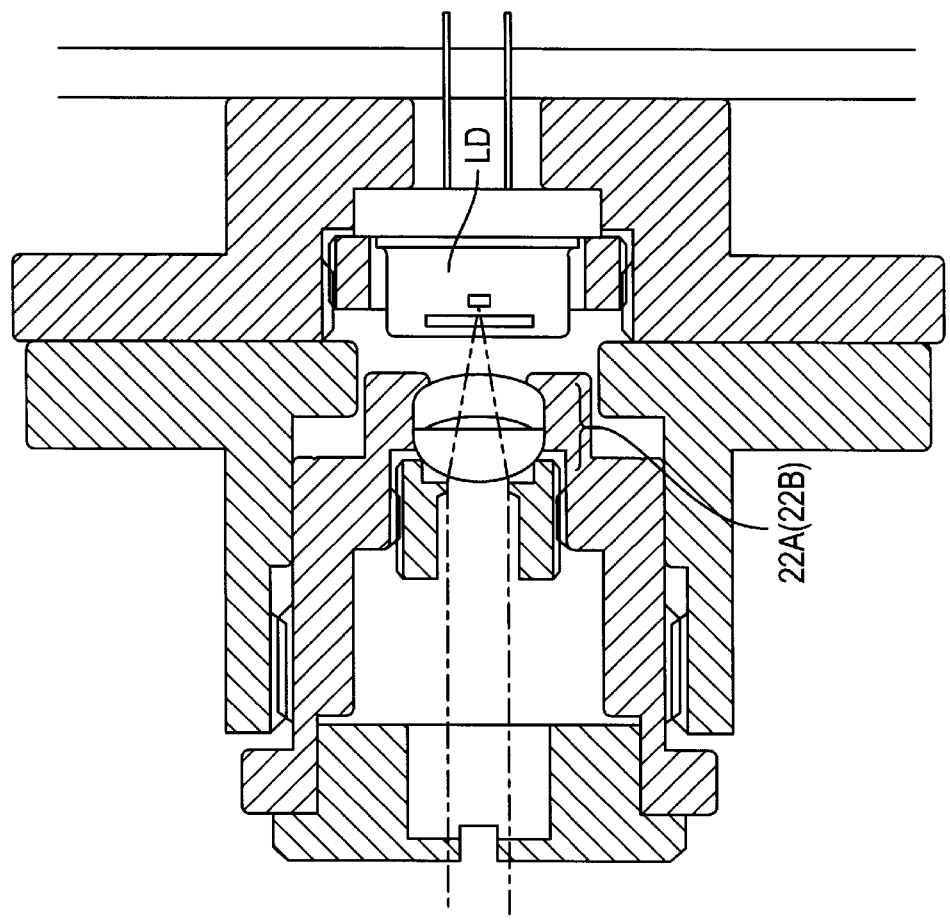

CASCADE SCANNING OPTICAL SYSTEM

BACKGROUND OF THE INVENTION

1. Field of the Invention

The present invention relates to a cascade scanning optical system having a plurality of laser scanning optical systems which are arranged along the main scanning direction and controlled to operate in synchronization with each other so as to realize a wide scanning line.

2. Description of the Related Art

A cascade scanning optical system having a plurality of laser scanning optical systems arranged along the main scanning direction to realize a wide scanning line is known. Such a type of scanning optical system is disclosed in Japanese Laid-Open Patent Publication No.61-11720, published on Jan. 20, 1986. This publication discloses a cascade scanning optical system having a pair of laser scanning optical systems each having a laser beam emitter, a polygon mirror serving as a deflecting device, an fθ lens, etc. The pair of laser scanning optical systems are synchronously driven to emit respective scanning laser beams to a photoconductive surface (scanning surface) of a photoconductive drum on a common line thereon extending in parallel to the axial direction of the photoconductive drum. The pair of scanning laser beams respectively scan two adjacent ranges of the common line on the photoconductive surface so as to scan the photoconductive surface of the photoconductive drum in the main scanning direction in a wide range.

There is a fundamental problem to be overcome in such a type of cascade scanning optical system. Namely, how can a scanning line, made on the photoconductive drum by the scanning laser beam emitted from one laser scanning optical system of the cascade scanning optical system, be accurately combined with another scanning line, made on the photoconductive drum by the scanning laser beam emitted from another laser scanning optical system of the cascade scanning optical system, so as not to be apart from each other or overlap each other in either the main scanning direction or the sub-scanning direction, i.e., so as to form a straight and continuous scanning line using a combination of the separate scanning lines.

In the case where each laser scanning optical system of the cascade scanning optical system is designed as a non-telecentric system through which the incident angle of a scanning laser beam relative to the photoconductive surface of the photoconductive drum varies in accordance with a variation in the position of a scanning spot of the scanning laser beam on the photoconductive surface in the main scanning direction, a scanning line made through one laser scanning optical system will not be precisely combined with another scanning line made through another laser scanning optical system on the photoconductive surface of the photoconductive drum, i.e., those scanning lines will be apart from each other or overlap each other by a certain amount in the main scanning direction if the photoconductive surface deviates from its original position even by a slight amount.

In the case where each laser scanning optical system of the cascade scanning optical system is designed as a telecentric system through which the scanning laser beam of each laser scanning optical system is always incident on the photoconductive surface in a direction perpendicular to an axial direction of the photoconductive drum, specifically in a direction orthogonal to generatrices of the photoconductive drum, the aforementioned problem in the case of the non-telecentric system will not occur, but it is necessary for each laser scanning optical system to be arranged at different positions in the sub-scanning direction to differentiate the angles of respective laser beams relative to the photoconductive surface, in order to prevent the respective laser beams from interfering with each other. However, with such an arrangement, if the photoconductive surface deviates from its original position even by a slight amount, a scanning line made through one laser scanning optical system and another scanning line made through another laser scanning optical system on the photoconductive drum will deviate from each other in the sub-scanning direction, and accordingly the former and latter scanning lines will not be combined with each other in the main scanning direction, so that a wide scanning line made by a combination of those scanning lines which extend in the main scanning direction across the photoconductive surface of the drum cannot be formed.

SUMMARY OF THE INVENTION

The primary object of the present invention is to provide a cascade scanning optical system having a pair of laser scanning optical systems each designed as a non-telecentric system, wherein a scanning line made by the scanning laser beam emitted from one of the pair of laser scanning optical systems and another scanning line made by the other of the pair of laser scanning optical systems on the scanning surface will not be far apart from each other or far overlap each other in the main scanning direction even if a scanning surface deviates from its original position.

To achieve the object mentioned above, according to an aspect of the present invention, there is provided a cascade scanning optical system which includes a first laser scanning optical system for emitting a first laser beam to scan a surface of a member to generate a first scanning line, and a second laser scanning optical system for emitting a second laser beam to scan the surface to generate a second scanning line, wherein the first and second laser scanning optical systems are arranged so as to combine the first scanning line with the second scanning line at a point of contact therebetween in a main scanning direction to form a single scanning line, and wherein each of the first and second laser scanning optical systems is designed as a non-telecentric system through which the incident angle of a corresponding one of the first and second laser beams relative to the surface varies in accordance with a variation in the position of a scanning spot of the corresponding one of the first and second laser beams on the surface in the main scanning direction, and further wherein an incident angle of each of the first and second laser beams relative to the surface in the vicinity of the point of contact is predetermined to be larger than an incident angle of the same in the vicinity of a corresponding one of opposite ends of the single scanning line. With this arrangement, since the former incident angle is predetermined to be larger than the latter incident angle, the former incident angle will not vary so much as compared with the variation amount of the position of the surface of the member in the case where the surface of the member deviates from its original position. Accordingly, the first and second scanning lines will not be far apart from each other or far overlap each other in the main scanning direction even if the surface of the member deviates from its original position.

Preferably, the member is a drum having the surface on a periphery of the drum.

Preferably, the following formula is satisfied:

$(a/2) \tan \theta > (b+c)/2$ wherein "θ" represents an incident angle of each of the first and second laser beams relative to the surface in the vicinity of the point of contact, "a" represents an acceptable deviation amount (mm) occurring between scanning spots of the first and second scanning laser beams at the point of contact on the surface, "b" represents an amplitude (mm) of the drum in a direction perpendicular to an axial direction of the drum, due to a deviation of the drum from its original position caused by an installation error at the time the drum is installed, and "c" represents an amplitude (mm) of the drum in the direction perpendicular to the axial direction of the drum, due to a common difference of an outer peripheral surface of the drum.

Preferably, the first and second laser scanning optical systems are composed of the same optical elements.

Preferably, the optical elements include a laser beam emitter, a polygon mirror and an fθ lens.

Preferably, the first and second laser scanning optical systems are symmetrically arranged.

The present disclosure relates to subject matter contained in Japanese Patent Application No.8-230246 (filed on Aug. 30, 1996) which is expressly incorporated herein by reference in its entirety.

BRIEF DESCRIPTION OF THE DRAWINGS

The invention will be described below in detail with reference to the accompanying drawings in which:

FIG. 3 is a cross-sectional view of a laser collimating unit provided in the cascade scanning optical system shown in FIG. 1.

DESCRIPTION OF THE PREFERRED EMBODIMENT

Figure 1:
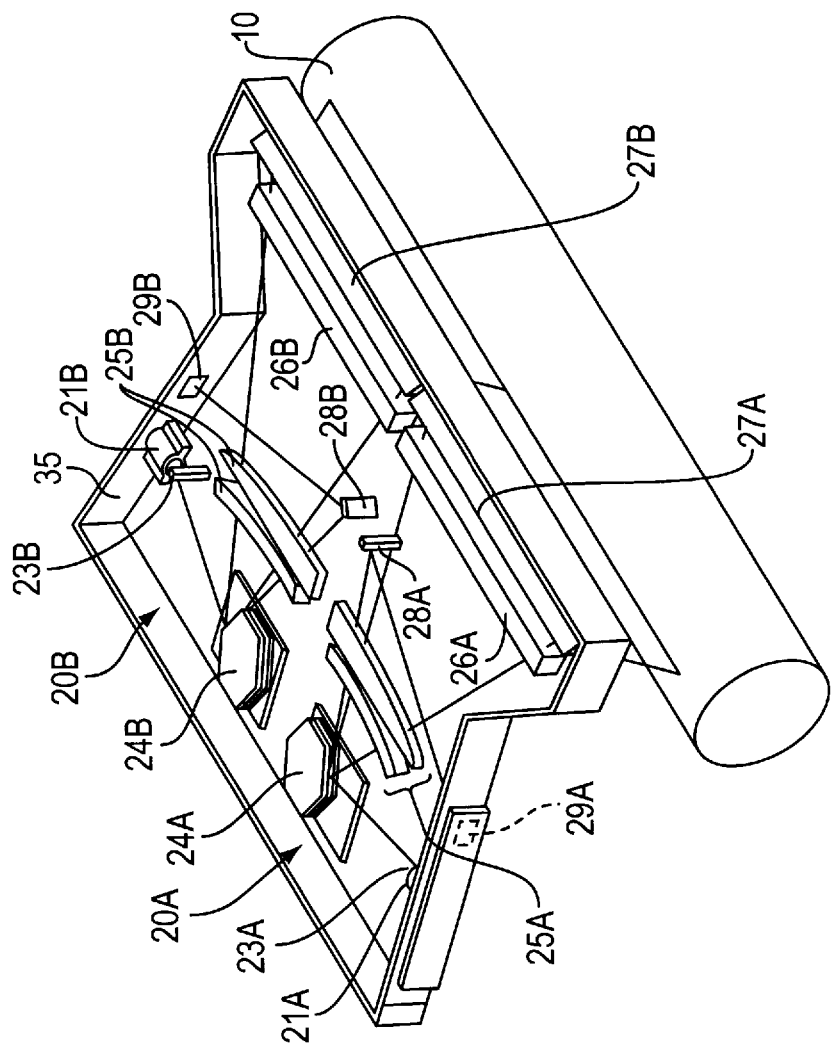
FIG. 1 is a perspective view of an embodiment of a cascade scanning optical system to which the present invention is applied, showing only fundamental elements thereof.
Figure 2:
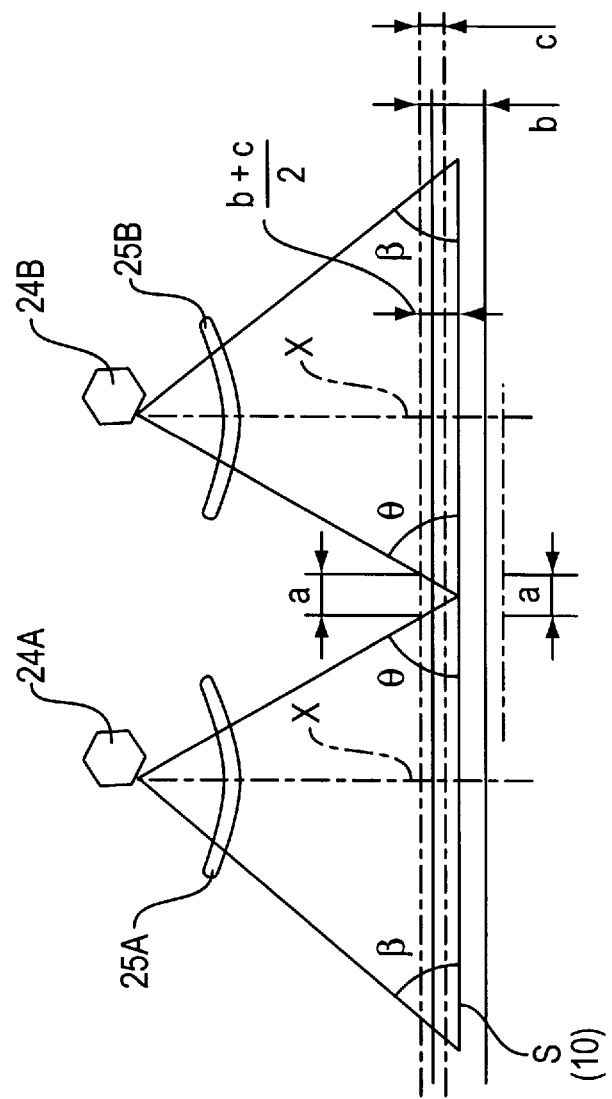
FIG. 2 is a plan view of a part of the cascade scanning optical system shown in FIG. 1.

FIGS. 1 and 2 show an embodiment of a cascade scanning optical system for scanning the photoconductive surface of a photoconductive drum (rotating member) 10 provided in a laser-beam printer. The cascade scanning optical system is provided with a pair of laser scanning optical systems, i.e., a first scanning optical system 20A and a second scanning optical system 20B. Each of the first and second optical systems 20A and 20B is designed as a non-telecentric system, so that the incident angle of a scanning laser beam emitted from each of the first and second optical systems 20A and 20B relative to the photoconductive surface of the drum 10 varies in accordance with a variation in the position of the scanning spot of the scanning laser beam on the photoconductive surface in the main scanning direction. The first and second scanning optical systems 20A and 20B are provided with the same optical elements or parts, that is, the first scanning optical system 20A is provided with a laser collimating unit 21A serving as a laser beam emitter, a cylindrical lens 23A, a polygon mirror 24A, an fθ lens group 25A, an auxiliary lens 26A and a mirror 27A, while the second scanning optical system 20B is provided with a laser collimating unit 21B serving as a laser beam emitter, a cylindrical lens 23B, a polygon mirror 24B, an fθ lens group 25B, an auxiliary lens 26B and a mirror 27B. Each of the fθ lens groups 25A and 25B consists of two lens elements as can be seen from FIG. 1. The first and second scanning optical systems 20A and 20B are arranged side by side in a direction parallel to the axial direction of the drum 10 and are supported by a common casing 35 on an inner flat surface thereof.

The laser collimating units 21A and 21B are identical. FIG. 3 shows the laser collimating unit 21A (21B). Each of the units 21A and 21B is provided with a laser diode LD and a collimating lens group 22A or 22B consisting of a pair of lens elements.

In each of the first and second scanning optical systems 20A and 20B, the laser beam emitted from the laser diode LD is collimated through the collimating lens group 22A or 22B. Thereafter this collimated laser beam is incident upon the cylindrical lens 23A or 23B positioned in front of the corresponding laser collimating unit 21A or 21B. The laser collimating lens 23A or 23B has a power in the sub-scanning direction, so that the spot of the laser beam incident thereon is elongated therethrough in the same direction to be incident upon the corresponding polygon mirror 24A or 24B. The polygon mirrors 24A and 24B are each driven to rotate, so that laser beams incident thereon are deflected in the main scanning direction to proceed toward the mirrors 27A and 27B through the fθ lens groups 25A and 25B and the auxiliary lenses 26A and 26B, respectively. Subsequently, the laser beams incident upon the mirrors 27A and 27B are reflected thereby towards the photoconductive drum 10, to thereby scan the same in the main scanning direction.

Each of the auxiliary lenses 26A and 26B has a power mainly in the sub-scanning direction. In order to reduce the size of the cascade scanning optical system, it is possible to omit each of the auxiliary lenses 26A and 26B. In such a case, the fθ lens groups 25A and 25B are designed to have a power similar to the power of the auxiliary lenses 26A and 26B, respectively. In FIG. 2 the auxiliary lenses 26A and 26B are not illustrated.

The polygon mirror 24A rotates in a clockwise direction while the polygon mirror 24B rotates in a counterclockwise direction, as viewed in FIG. 2. Namely, the polygon mirrors 24A and 24B rotate in opposite rotational directions to scan the photoconductive surface of the drum 10 from its approximate center toward respective opposite ends in opposite directions. A mirror 28A is fixedly provided in the casing 35 at a position to receive the scanning laser beam emitted from the fθ lens group 25A before the scanning laser beam is incident on the photoconductive surface of the drum 10 through the auxiliary lens 26A and the mirror 27A at each scanning sweep while the polygon mirror 24A rotates. The laser beam reflected by the mirror 28A is incident on a laser beam detector 29A fixedly provided in the casing 35 at a position opposite to the mirror 28A. Likewise, a mirror 28B is fixedly provided in the casing 35 at a position to receive the scanning laser beam emitted from the fθ lens group 25B before the scanning laser beam is incident on the photoconductive surface of the drum 10 through the auxiliary lens 26B and the mirror 27B at each scanning sweep while the polygon mirror 24B rotates. The laser bean reflected by the mirror 28B is incident on a laser beam detector 29B fixedly provided in the casing 35 at a position opposite to the mirror 28B.

The laser diodes LD of the laser collimating units 21A and 21B are each controlled to turn its laser emission ON or OFF in accordance with given image data to draw a corresponding image (charge-latent image) on the photoconductive surface of the drum 10, and subsequently this image drawn on the photoconductive surface of the drum is transferred to plain paper according to a conventional electrophotographic method. The polygon mirrors 24A and 24B are synchronously controlled with the use of the laser beam detectors 29A and 29B, such that on the photoconductive surface of the drum 10 the scanning starting point of a spot of the scanning laser beam emitted from the first scanning optical system 20A is properly and precisely adjacent to the scanning starting point of a spot of the scanning laser beam emitted from the second scanning optical system 20B, and that those two spots move in opposite directions apart from each other in the main scanning direction to thereby form a wide scanning line on the photoconductive surface of the drum 10. With the rotational movement of the photoconductive drum 10, which is synchronized to the rotational movement of each of the polygon mirrors 24A and 24B, a series of wide scanning lines are made on the photoconductive surface of the drum 10 to thereby obtain a certain image (charge-latent image) on the photoconductive surface of the drum 10.

In each of the first and second scanning optical systems 20A and 20B the incident angle of the laser beam upon the photoconductive surface of the drum 10 is predetermined in a manner hereinafter discussed. The incident angle θ (degree) relative to the photoconductive surface is, in theory, in the range of more than 0° and less than 180° (0°<θ<180°). However, the incident angle θ° is represented by an angle of 90° or less than 90° for the purpose of illustration (θ≦90°).

As shown in FIG. 2, a pair of fan-shaped paths of the pair of scanning laser beams from the rotating polygon mirrors 24A and 24B to the photoconductive surface of the drum 10 are symmetrically arranged in the main scanning direction relative to a border line therebetween across the point (a point of contact) where opposing ends of two scanning lines formed by the pair of scanning laser beams on the photoconductive surface of the drum 10 are combined.

Provided that the incident angle of each of the pair of canning laser beams incident upon the photoconductive surface of the drum 10 at the aforementioned point of contact is "θ", and that the incident angle of each of the pair of scanning laser beams incident upon the photoconductive surface of the drum 10 at respective opposite ends of a wide scanning line is "β", θ is predetermined to be larger than β in the present embodiment (θ>β). In such a case where the incident angle θ is set larger than the incident angle β, preferably an angle nearly 90°, the incident angle θ will not vary so much as compared with the variation amount of the position of the drum 10 in the case where the drum 10 deviates from its original position. Namely, a scanning line made by one of the pair of scanning laser beams and another scanning line made by the other of the pair of scanning laser beams on the photoconductive surface of the drum 10 will not be far apart from each other or overlap each other in the main scanning direction at the aforementioned point of contact even if the drum 10 deviates from its original position. However, the incident angle β will vary greater than the incident angle θ in the case where the drum 10 deviates from its original position since the incident angle β is set smaller than the incident angle θ as mentioned above. However, it means that merely the positions of spots of the pair of scanning laser beams on the photoconductive surface at or in the vicinity of the respective opposite ends (respective scanning ending points) of a wide scanning line will vary greater as compared with the positions of spots of the pair of scanning laser beams on the photoconductive surface at or in the vicinity of the aforementioned point of contact. However, this is not considered a serious problem.

The incident angle θ preferably satisfies the following formula:

$$(a/2) \tan \theta > (b+c)/2 \qquad \text{①}$$

wherein "a" represents the acceptable deviation amount (mm) occurring between the spots of the pair of scanning laser beams at the aforementioned point of contact on the photoconductive surface ("a", is equal to or smaller than the diameter of a scanning laser beam);

"b" represents the amplitude (mm) of the drum 10 in an optical direction X (see FIG. 2) of the scanning laser beams due to a deviation of the drum 10 from its original position that is caused by an installation error or the like at the time the drum is installed; and "c" represents the amplitude (mm) of the drum 10 in the optical direction X due to the common difference of he outer peripheral surface (cylindrical surface) of the drum 10. The optical direction X extends perpendicular to the main scanning direction.

The reason that the aforementioned formula ① is to be satisfied will be hereinafter discussed.

In FIG. 2, the photoconductive surface of the drum 10 to be scanned which is located at its original position (ideal position), where a pair of scanning lines formed on the photoconductive surface of the drum 10 by the pair of scanning laser beams are properly combined at a point of contact therebetween, is shown by an original surface s. Supposing that the drum 10 deviates, e.g. due to an error, from the position of the original surface S in the optical direction X by the aforementioned shift amount b, and additionally further deviates in the same direction by the aforementioned common difference c, the largest deviation amount (shift amount) is represented by the following formula:

$$(b+c)/2$$

This largest deviation amount is also represented by the following formula:

$$(a/2) \tan \theta$$

wherein "a" represents, as noted above, the acceptable deviation amount (mm) occurring between the spots of the pair of scanning laser beams at the aforementioned point of contact on the photoconductive surface ("a" is equal to or smaller than the diameter of a scanning laser beam); and "θ" represents, as noted above, the incident angle of each of the pair of scanning laser beams incident upon the photoconductive surface of the drum 10 at the aforementioned point of contact.

Hence, the following equation is obtained:

$$(a/2) \tan \theta = (b+c)/2$$

Accordingly, in order to make the largest deviation amount "(b+c)/2" fall within an acceptable limit, the aforementioned formula "(a/2) tan θ>(b+c)/2" must be satisfied.

In the above embodiment, although only one pair of laser scanning optical systems 20A and 20B is used to form a wide scanning line, more than one pair of laser scanning optical systems may be arranged in series in the main scanning direction to form a wider scanning line.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A cascade scanning optical system, comprising:

a first laser scanning optical system that emits a first laser beam to scan a surface of a member to generate a first scanning line; and a second laser scanning optical system that emits a second laser beam to scan said surface to generate a second scanning line, wherein said first laser scanning optical system and said second laser scanning optical system are arranged so as to combine said first scanning line with said second scanning line at a point of contact therebetween in a main scanning direction to form a single scanning line, wherein each of said first scanning optical system and said second laser scanning optical system is designed as a non-telecentric system through which an incident angle of a corresponding one of said first laser beam and said second laser beam relative to said surface varies in accordance with a variation in a position of a scanning spot of said corresponding one of said first laser beam and said second laser beam on said surface in said main scanning direction, and wherein an incident angle of each of said first laser beam and said second laser beam relative to said surface in the vicinity of said point of contact is predetermined to be larger than an incident angle of the same in the vicinity of a corresponding one of opposite ends of said single scanning line.

2. The cascade scanning optical system according to claim 1, wherein said member is a drum having said surface on a periphery of said drum.

3. The cascade scanning optical system according to claim 2, wherein a following formula is satisfied:

$$(a/2) \tan \theta > (b+c)/2$$

wherein "$\theta$" represents said incident angle of each of said first laser beam and said second laser beam relative to said surface in the vicinity of said point of contact, "a" represents an acceptable deviation amount (mm) occurring between said scanning spots of said first scanning laser beam and said second scanning laser beam at said point of contact on said surface, "b" represents an amplitude (mm) of said drum in a direction perpendicular to an axial direction of said drum, due to a deviation of said drum from its original position caused by an installation error at a time said drum is installed, and "c" represents an amplitude (mm) of said drum in said direction perpendicular to said axial direction of said drum, due to a common difference of an outer peripheral surface of said drum.

4. The cascade scanning optical system according to claim 1, wherein said first laser scanning optical system and said second laser scanning optical system are composed of the same optical elements.

5. The cascade scanning optical system according to claim 4, wherein said optical elements comprise a laser beam emitter, a polygon mirror and an f$\theta$ lens.

6. The cascade scanning optical system according to claim 4, wherein said first laser scanning optical system and said second laser scanning optical system are symmetrically arranged.

* * * * *